(No Model.)
F. K. HESSE.
ANGLE ATTACHMENT FOR DENTAL HANDPIECES.
No. 514,074. Patented Feb. 6, 1894.
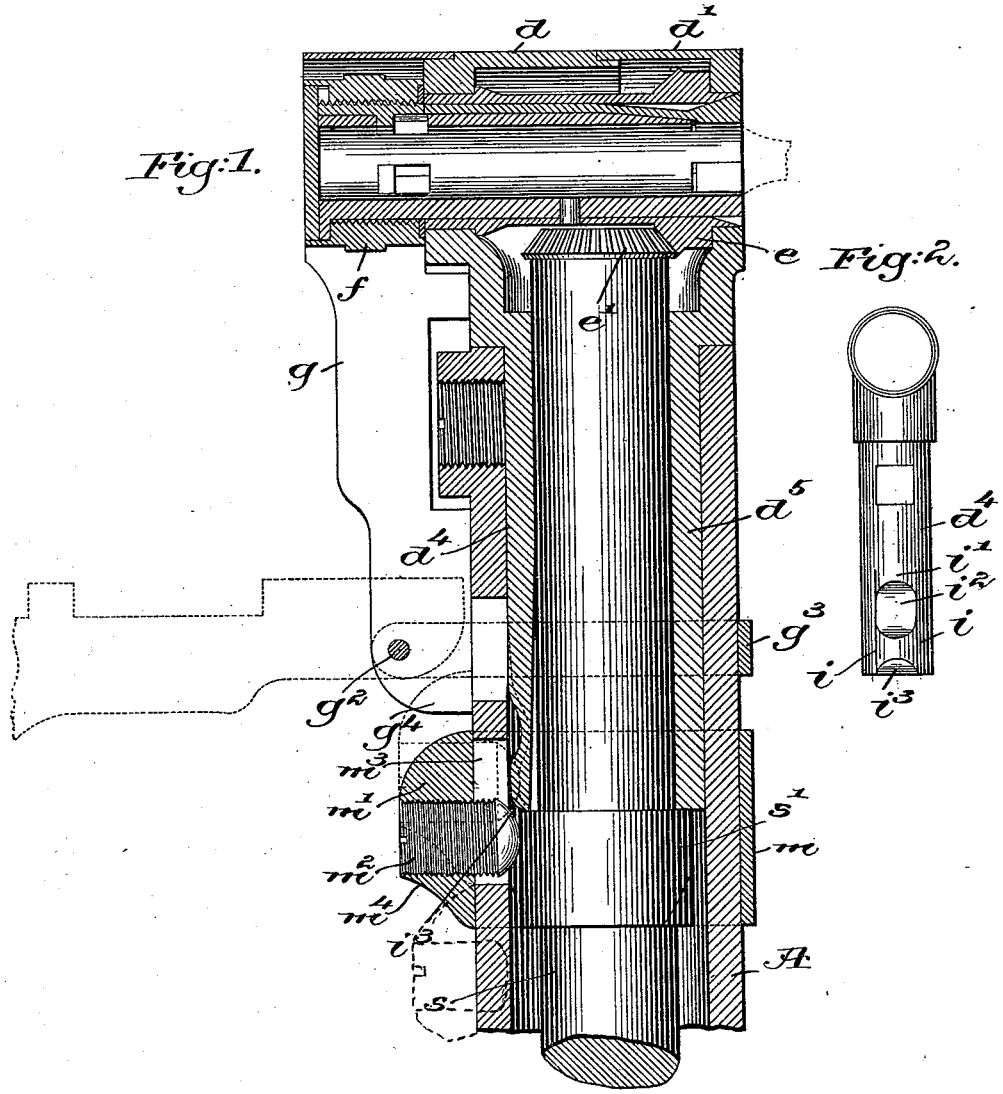

UNITED STATES PATENT OFFICE.

FRANK K. HESSE, OF BOSTON, MASSACHUSETTS, ASSIGNOR TO CODMAN & SHURTLEFF, OF SAME PLACE.

ANGLE ATTACHMENT FOR DENTAL HANDPIECES.

SPECIFICATION forming part of Letters Patent No. 514,074, dated February 6, 1894.

Application filed March 11, 1893. Serial No. 465,517. (No model.)

*To all whom it may concern:*

Be it known that I, FRANK K. HESSE, of Boston, county of Suffolk, State of Massachusetts, have invented an Improvement in Angle Attachments for Dental Engines, of which the following description, in connection with the accompanying drawings, is a specification, like letters on the drawings representing like parts.

This invention relates to angle attachments for dental engines, and has for its object to provide a manually operable device to prevent rotation of the chuck driving spindle during the opening of the chuck to release a tool.

In carrying out this invention I have had particularly in mind the construction and arrangement of such a locking device in a position which will least interfere with the workman in opening and closing the chuck to effect a change of tools.

While the device as I prefer to construct it is operated to lock the driving spindle independently of the movement of any nut protecting device, which latter if used must be moved to uncover the nut before the nut can be rotated to clamp or release a tool, yet I prefer to construct the device as will be hereinafter set forth, so that the return of the protector to cover the nut after the change of tools has been effected will automatically release the spindle locking device.

In the drawings Figure 1 represents, on an enlarged scale, a vertical section of an angle attachment embodying this invention, and Fig. 2, on a smaller scale, an elevation of the inclosing case looking from the left Fig. 1.

Referring to the drawings, A represents the end of a holder in which is journaled in usual or suitable manner the chuck driving spindle $s$, said holder and spindle being so arranged and constructed as to be readily attached to or detached from a dental engine, not shown. The chuck driving spindle $s$ at its upper end is provided, as shown, with a bevel gear $e'$, which is in mesh with a mating gear $e$ on and rotatable with the tool holding chuck, which, so far as this invention is concerned, may be of any desired type or construction, I having in the present instance, for the sake of illustrating this invention, shown a chuck substantially like that shown and described in my application Serial No. 450,734, filed November 2, 1892, to which reference may be had if desired, like letters representing like parts. Chucks of this and of most classes are made to open and close to effect the release or clamping of a tool by means of a rotatable nut located at one end of the chuck and herein represented by the nut $f$. A protector $g$ surrounds the nut to prevent contact of the latter, during rotation, with the mouth when the angle attachment is in use, said detector being pivoted as usual at $g^2$ between suitable ears on a ring $g^3$ surrounding the holder A, all of which may be of usual or well known construction. In the present instance the chuck driving spindle $s$ has its bearings in the semi-circular shanks $d^4$, $d^5$, of the parts $d$, $d'$, of the inclosing case for the attachment.

In accordance with this invention I provide two longitudinal slits $i$, $i$, in one of the shanks, as, for instance, the shank $d^4$, see Fig. 2, said slits leaving between them a tongue $i'$ which is preferably thinned at $i^2$ to make the same more elastic. The lower end of the tongue is chamfered off, as at $i^3$.

Referring now to Fig. 1, $m$ is a longitudinally movable actuator shown as a sleeve surrounding the holder A, said sleeve at one side having a thickened portion $m'$ in which is tapped a screw $m^2$, the inner rounded end of which constitutes a cam which projects through a slot $m^3$ in the holder A into the interior thereof, as shown, the said screw, when the sleeve is in its normal position, lying directly below the lower chamfered end of the spring tongue $i'$. When a tool is to be released the workman holding the holder A in one hand, will, by the other hand, turn the protector $g$ down into its dotted position Fig. 1 to uncover the chuck operating nut $f$; he will then slide the actuator or sleeve $m$ up into its dotted position Fig. 1, this being most conveniently done by means of the thumb of the hand in which the holder is held, such movement of the actuator $m$ causing the rounded inner end of the screw $m^2$ to act upon the chamfered end of the tongue $i'$ and push the same inwardly against the chuck driving spindle $s$ to hold the latter frictionally from rotation. With the actuator $m$ held in position, with the spindle clamped or locked against rotation, the workman can then rotate the nut $f$ to release or clamp a tool. A new tool having been clamped in the tool-holding chuck, the protector $g$ is turned up into its normal full line position Fig. 1 to cover the nut, such movement of the protector causing its tail portion $g^4$ to act upon the actuator $m$ and push the same down into its normal full line position, Fig. 1, to release the chuck driving spindle. It will thus be seen that the spindle is automatically unlocked or released when the protector is moved into its normal position covering the nut $f$.

By my improved device the finger which presses against the actuator $m$ to keep the same in its uppermost position clamping the spindle is not in a position to interfere with the rotation of the nut $f$ by the other hand, as is the case where the protector $g$ must be held in its lowermost dotted position in order to clamp the spindle.

While I prefer to employ the particular construction herein shown, yet this invention is not restricted in this respect, for the construction of the various parts may be varied without departing from the scope and spirit of this invention. For instance, the spring tongue $i'$, herein shown as forming a part of the sleeve-like bearing shanks $d^4$, $d^5$, may be formed independently of any such bearing if desired, and the rounded end of the screw $m^2$, which constitutes a cam surface on the actuator $m$ to act upon the tongue, may be formed as an integral part of the sleeve if desired instead of in the form of an adjustable screw. If desired also, the inner end of the screw $m^2$, instead of pressing a spring tongue against the spindle, may be made to press directly against a portion of the spindle itself, for instance the enlarged portion or collar $s'$, may have its lower edge rounded or beveled, as shown in dotted lines, and the actuator $m$ may be dropped sufficiently to carry the screw $m^2$ below said portion $s'$, so that upward sliding movement of the actuator will cause the screw to bear frictionally against the portion $s'$ and prevent rotation of the spindle. In such case if automatic release were desired the pivoted point $g^2$ of the protector $g$ shall be correspondingly dropped.

I claim—

1. In an angle attachment for dental engines, the combination with a chuck driving spindle, a tool chuck and a nut to operate the same, of a hinged protector for said nut, and a locking device movable independently of said protector to lock the said spindle against rotation and automatically moved by said protector to release the said spindle when the said protector is moved into position to cover the said nut, substantially as described.

2. In an angle attachment for dental engines, the combination with a holder, a chuck driving spindle journaled therein, a tool chuck, and a nut to operate the same, of a protector for said nut hinged on said holder, and a sliding actuator adapted to be moved in one direction independently of said protector and in an opposite direction by or independently of said protector, and a locking device for said spindle operated by movement of said actuator, substantially as described.

3. In an angle attachment for dental engines, the combination with a holder, a chuck driving spindle journaled therein, a tool chuck, and a nut to operate the same, of a sliding actuator, and a locking device for said spindle operated by movement of said actuator, substantially as described.

4. In an angle attachment for dental engines, a holder, a tool chuck, a nut to operate the same, and an inclosing case for said chuck having a tubular shank extended within said holder, and having a spring tongue, combined with a sliding actuator, and a cam thereon to act upon said tongue, substantially as described.

In testimony whereof I have signed my name to this specification in the presence of two subscribing witnesses.

FRANK K. HESSE.

Witnesses:
  FREDERICK L. EMERY,
  LOUIS N. GONELL.